US006742837B1

(12) United States Patent  
Alexander

(10) Patent No.: US 6,742,837 B1
(45) Date of Patent: Jun. 1, 2004

(54) CAR SEAT NETTING SYSTEMS

(76) Inventor: David P. Alexander, 1971 W. Lumeden Dr. #124, Brandon, FL (US) 33511

( * ) Notice: Subject to any disclaimer, the term of this patent is extended or adjusted under 35 U.S.C. 154(b) by 0 days.

(21) Appl. No.: 10/084,098

(22) Filed: Feb. 27, 2002

(51) Int. Cl.[7] ................................................. B60R 7/04
(52) U.S. Cl. ........................... 297/188.21; 297/188.04; 297/188.06; 297/188.2
(58) Field of Search ....................... 297/188.01, 188.04, 297/188.06, 188.2, 188.21

(56) References Cited

U.S. PATENT DOCUMENTS

| | | | | |
|---|---|---|---|---|
| 2,659,420 A | * | 11/1953 | Burke | 297/230.1 |
| 3,094,354 A | * | 6/1963 | Bernier | 297/112 |
| 3,169,781 A | * | 2/1965 | Abruzzino | 280/749 |
| 3,309,135 A | * | 3/1967 | Jannetto | 297/188.01 |
| 3,695,698 A | * | 10/1972 | Trump | 297/487 |
| 4,320,922 A | * | 3/1982 | Meritis | 297/220 |
| 4,600,238 A | * | 7/1986 | Goodford | 297/219.1 |
| 4,924,814 A | * | 5/1990 | Beaudet | 119/712 |
| 5,330,251 A | * | 7/1994 | McGuire | 297/229 |
| 5,354,119 A | * | 10/1994 | Nicholas | 297/188.07 |
| 5,492,257 A | * | 2/1996 | Demick | 224/275 |
| 5,529,341 A | * | 6/1996 | Hartigan | 280/749 |
| 6,079,773 A | * | 6/2000 | Hassan | 297/188.13 |
| 6,158,805 A | * | 12/2000 | Blaney | 297/184.11 |
| 6,318,611 B1 | | 11/2001 | Alexander | |
| 6,338,429 B1 | | 1/2002 | Pesce | |
| 6,343,835 B1 | | 2/2002 | Ledbetter | |
| 6,375,399 B1 | | 4/2002 | Sitzler et al. | |
| 6,386,412 B1 | | 5/2002 | Konechne | |
| 6,386,612 B2 | | 5/2002 | Hofmann et al. | |
| 6,390,293 B1 | | 5/2002 | Page et al. | |
| 6,405,909 B1 | | 6/2002 | Burnett et al. | |
| 6,409,066 B1 | | 6/2002 | Schneider et al. | |
| 6,422,440 B1 | | 7/2002 | Stone | |
| 6,427,887 B1 | | 8/2002 | Chain et al. | |
| 6,439,443 B1 | | 8/2002 | Liao | |
| 6,443,346 B1 | | 9/2002 | Haas | |
| 6,445,408 B1 | | 9/2002 | Watkins | |
| 6,450,378 B1 | | 9/2002 | Miller | |
| 6,502,859 B1 | * | 1/2003 | Svetlik | 280/749 |

FOREIGN PATENT DOCUMENTS

DE 3909397 A1 * 10/1990

* cited by examiner

Primary Examiner—Peter M. Cuomo
Assistant Examiner—Joseph Edell
(74) Attorney, Agent, or Firm—Duane Morris LLP

(57) ABSTRACT

Car sear system including a car seat assembly having a horizontal seat portion with a front edge and a rear edge and a vertical back portion with a top edge and a bottom edge. A sheet assembly includes a front sheet portion positionable above the front edge of the seat portion and side sheet portions positionable above the side edges of the seat portion. A tube assembly includes at least one vertical tube with the sheeting assembly coupled thereto. The tube is positionable adjacent to the seat portion. A securement assembly couples the sheeting assembly and tube in position with respect to the seat portion.

2 Claims, 10 Drawing Sheets

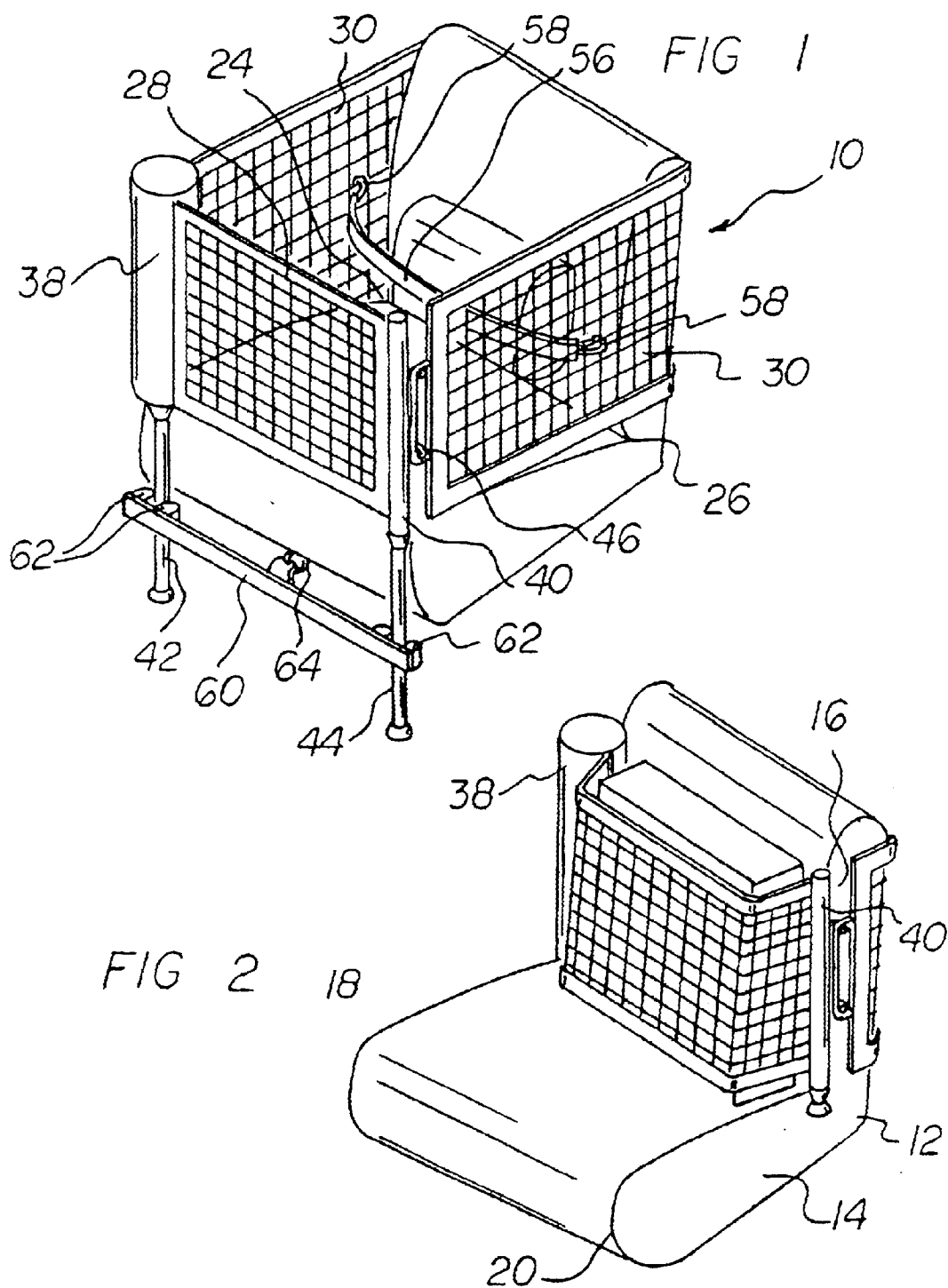

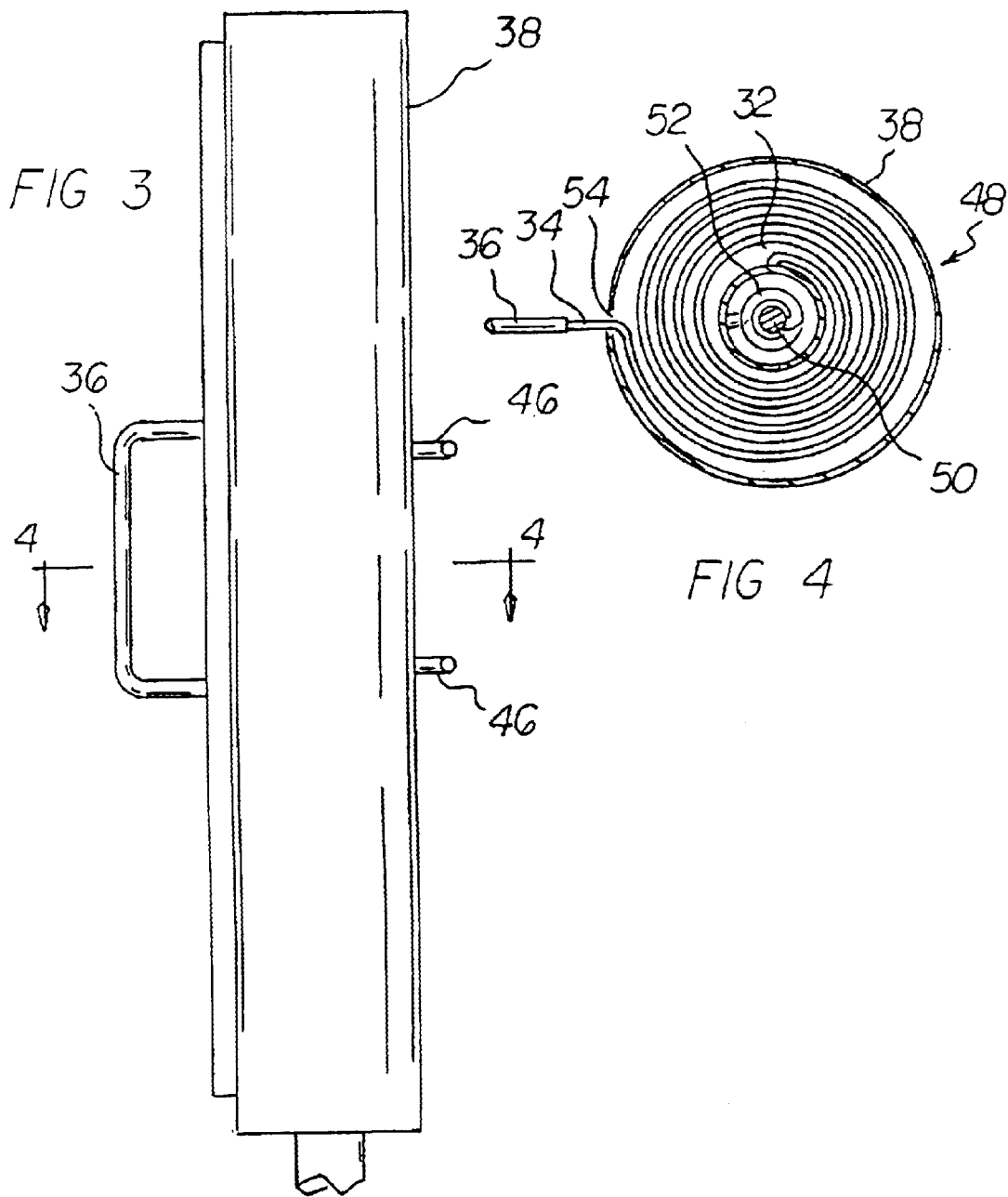

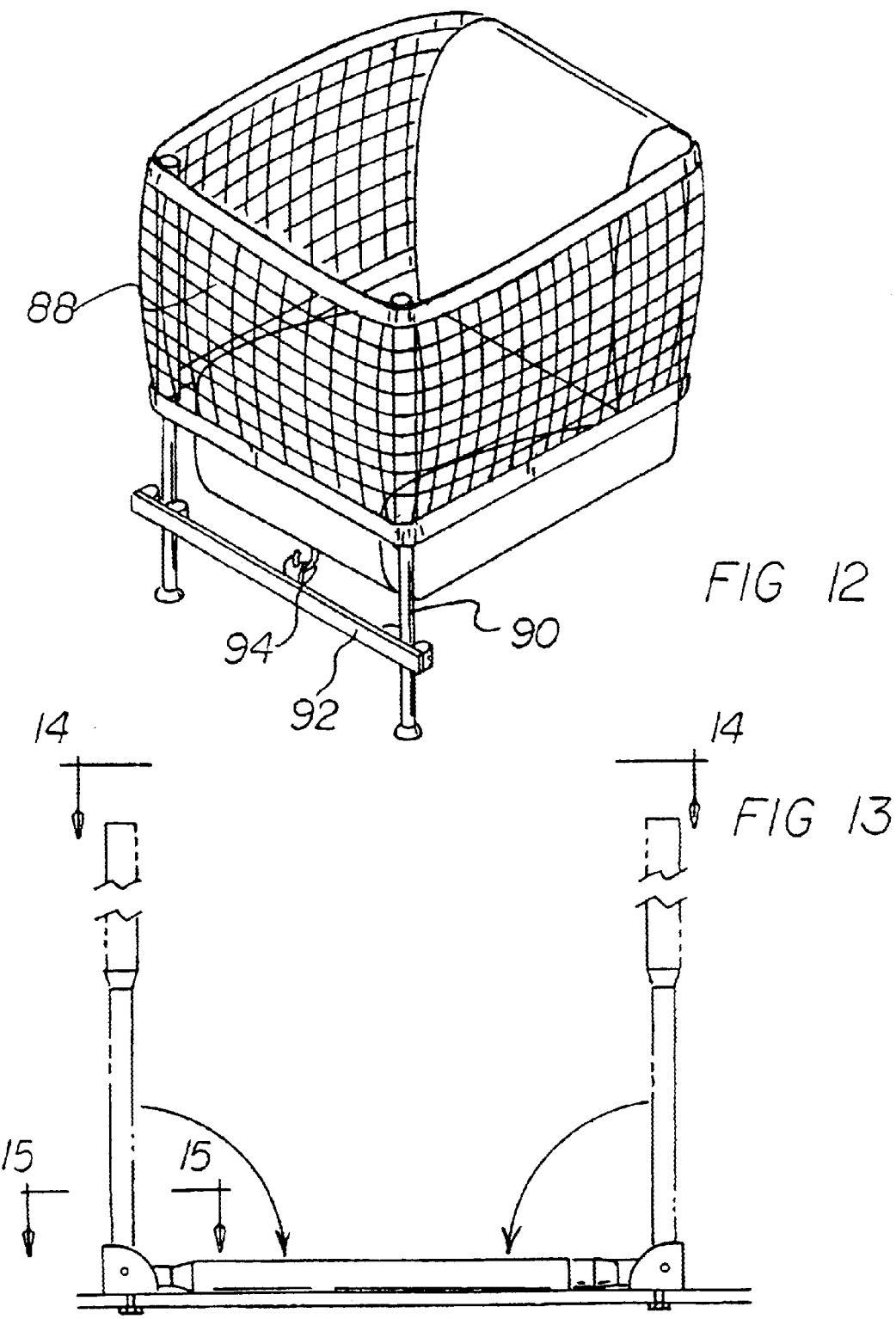

FIG 14
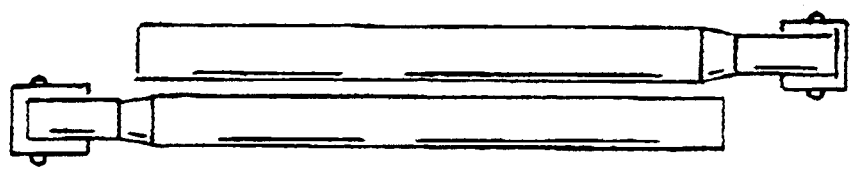
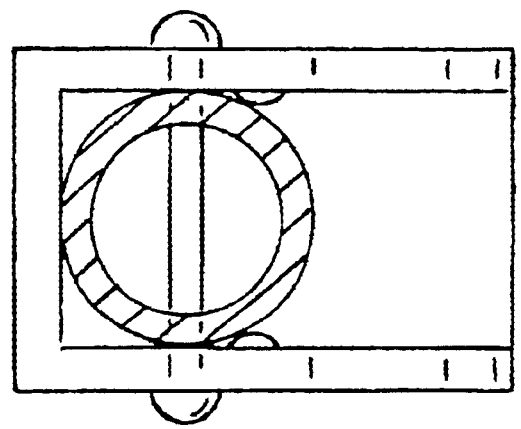
FIG 15

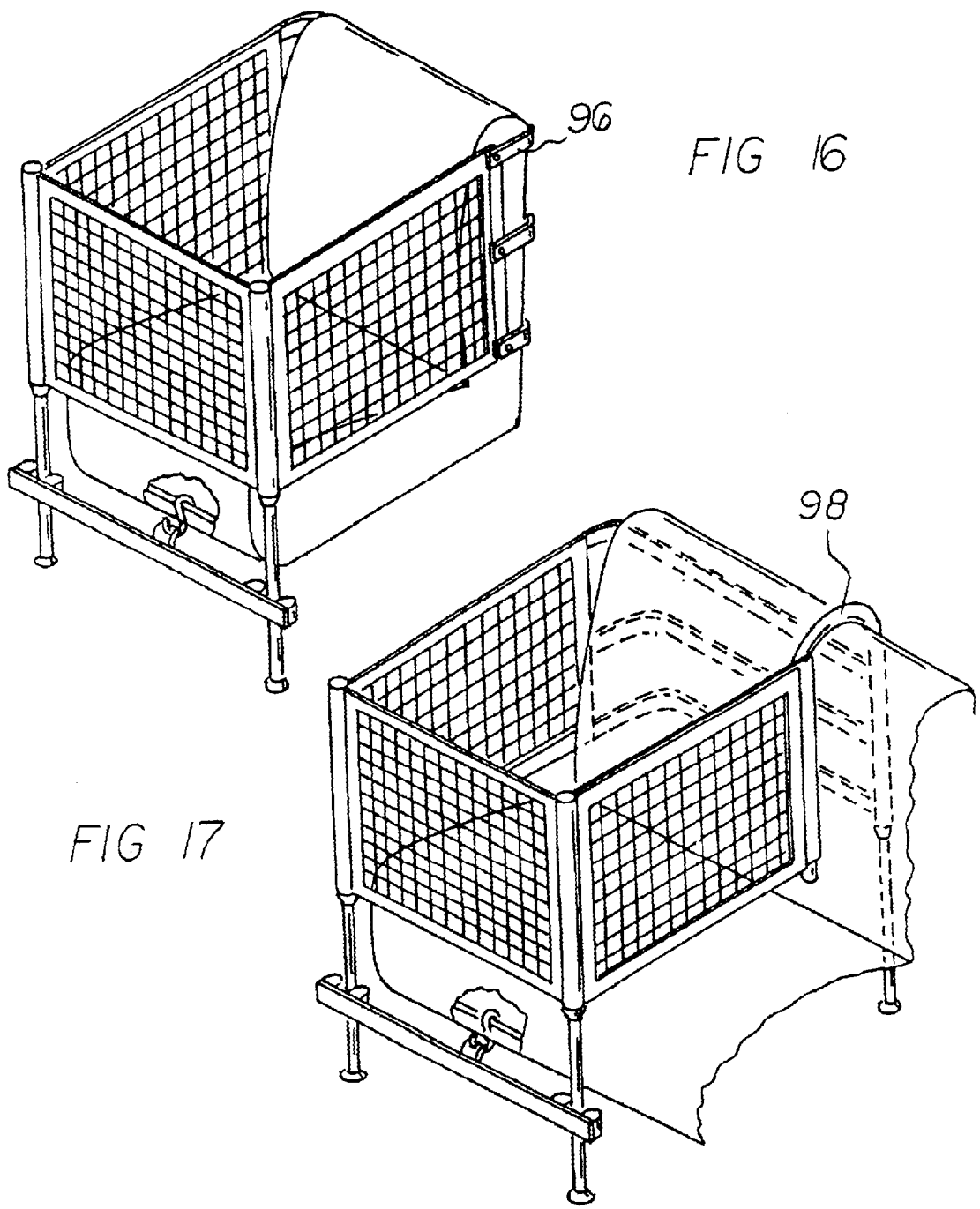

CAR SEAT NETTING SYSTEMS

BACKGROUND OF THE INVENTION

1. Field of the Invention

The present invention relates to car seat netting systems and more particularly pertains to safely and conveniently maintaining objects on the seat of a vehicle and/or restraining them against the seat.

2. Description of the Prior Art

The use of vehicle accessories of known designs and configurations is known in the prior art. More specifically, vehicle accessories of known designs and configurations previously devised and utilized for the purpose of retaining objects in a position where placed through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,633,936 to Huber discloses an automatically deployed occupant restraint system. U.S. Pat. No. 4,635,962 to Miyada discloses an inertial safety system for cars. Lastly, U.S. Pat. No. 4,708,384 to LaRosa discloses a protective automobile partition. Note is also taken of my prior patent, U.S. Pat. No. 6,38611 directed to a car seat netting system, the subject matter of which is incorporated herein by reference.

While these devices fulfill their respective, particular objectives and requirements, the aforementioned patents do not describe a car seat netting system that allows safely and conveniently maintaining objects on the seat of a vehicle and/or restraining them against the seat.

In this respect, the car seat netting systems according to the present invention substantially depart from the conventional concepts and designs of the prior art, and in doing so provides an apparatus primarily developed for the purpose of safely and conveniently maintaining objects on the seat of a vehicle and/or restraining them against the seat.

Therefore, it can be appreciated that there exists a continuing need for new and improved car seat netting systems which can be used for safely and conveniently maintaining objects on the seat of a vehicle and/or restraining them against the seat. In this regard, the present invention substantially fulfills this need.

SUMMARY OF THE INVENTION

In view of the foregoing shortcomings in the known types of vehicle accessories of known designs and configurations now present in the prior art, the present invention provides improved car seat netting systems. As such, the general purpose of the present invention, which will be described subsequently in greater detail, is to provide a new and improved car seat netting system and method which has all the advantages of the prior art and none of the disadvantages.

To attain this, the present invention essentially comprises a first provided is a car seat assembly. The car set assembly has a seat portion and a back portion. The seat portion is in an essentially horizontal plane with a top and a bottom and with a front edge and a parallel back edge and with two parallel side edges there between to form a first front corner and a second front corner. The back portion is in a substantially vertical plane with a front and a back and with an upper edge and a parallel lower edge and with two parallel side edges there between with the lower edge adjacent to the rear edge of the seat portion to form a first rear corner and a second rear corner. Next provided is a screen assembly. The screen assembly includes a flexible front screen section and a flexible side screen section. The front screen section is in a generally rectangular configuration with an upper edge and a parallel lower edge and two parallel side edges there between. The lower edge is positioned adjacent to the front of the seat portion and the side edges are spaced a distance essentially equal to the distance between the side edges of the seat portion. The side screen portions are in a generally rectangular configuration. The side screen has an interior edge and a parallel exterior edge and parallel upper and lower edges there between. The height of the side edges of the front screen section is essentially equal to the height of the side edges of the front screen section. The exterior end of one side screen section has attached thereto a c-shaped handle. A vertical tube assembly is next provided. The vertical tube assembly includes an enlarged tube and a slender tube. The side edges of the front screen section is secured between the enlarged tube and the slender tube. A leg extends downwardly from each tube. Each leg is positionable between a downwardly extended orientation and a retracted orientation essentially within its associated vertical tube. The slender tube has a pair of hooks 46 for receiving the handle of the side screen. Next, a handling assembly is provided. The handling assembly includes a spindle coaxially located within the enlarged tube. The spindle is secured to the interior end of a side screen section. The spindle has a spring tending to rotate the spindle to wind the screen assembly there around. A slot in the enlarged tube is provided for the sliding passage of the screen assembly between a coiled orientation and an uncoiled orientation. In this manner, when in the uncoiled orientation, the legs are extended adjacent to the front corners of the seat portion with the majority of the screen assembly out of the enlarged tube and extended rearwardly and around the back portion and forwardly with the handle coupled to the hooks to thereby safely retain large objects on the seat portion. When in the coiled orientation the legs are retracted adjacent to the rear corners of the seat portion with the minority of the side screen out of the enlarged tube and extended rearwardly and around the back portion and forwardly with the handle coupled to the hooks to thereby safely retain small objects on the seat portion. Next provided is a flexible strap. The flexible strap has a length slightly greater than the distance between the side edges of the back portion. The strap has ends with a clip at each end adapted to couple to the side screen section above the side edges of the seat portion for securing small objects on the seat portion. Multiple securement straps may be used in one net for compartmentalizing the interior. Lastly, a securement assembly is provided. The securement assembly includes a cross bar having a central extent and side extents with a front surface and a rear surface. A pair of elastomeric brackets on the rear face adjacent to the side extents are provided for contacting the legs when extended. A connector couples the rear face adjacent to the central extent to the bottom of the seat portion.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide new and improved car seat netting systems which have all of the advantages of the prior art vehicle accessories of known designs and configurations and none of the disadvantages.

It is another object of the present invention to provide new and improved car seat netting systems which may be easily and efficiently manufactured and marketed.

It is further an object of the present invention to provide new and improved car seat netting systems which are of durable and reliable constructions.

An even further object of the present invention is to provide new and improved car seat netting systems which are susceptible of a low cost of manufacture with regard to both materials and labor, and which accordingly are then susceptible of low prices of sale to the consuming public, thereby making such car seat netting systems economically available to the buying public.

Even still another object of the present invention is to provide car seat netting systems for safely and conveniently maintaining objects on the seat of a vehicle and/or restraining them against the seat.

Lastly, it is an object of the present invention to provide new and improved car seat systems in which a car seat assembly has a horizontal seat portion with a front edge and a rear edge and a vertical back portion with a top edge and a bottom edge. A sheet assembly includes a front sheet portion positionable above the front edge of the seat portion and a side sheet portion positionable above the side edges of the seat portion. A tube assembly includes at least one vertical tube with the sheeting assembly coupled thereto. The tube is positionable adjacent to the seat portion. A securement assembly couples the sheeting assembly and tube in position with respect to the seat portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of a car seat netting system constructed in accordance with the principles of the present invention.

FIG. 2 is a perspective illustration similar to FIG. 1 but showing the netting system in an alternate orientation.

FIG. 3 is a side elevational view of the large tube shown in FIGS. 1 and 2.

FIG. 4 is a cross sectional view taken along line 4—*4 of FIG. 3.

FIG. 12 is another alternate embodiment of the invention with an another type of securement assembly.

FIG. 13 is a front elevational view of an alternate leg assembly.

FIG. 14 is a top elevational view taken along line 14—14 of FIG. 13.

FIG. 15 is a plan view taken along line 15—15 of FIG. 13.

FIG. 16 is yet another alternate embodiment of the invention.

FIG. 17 is a perspective illustration of a final alternate embodiment of the invention.

The same reference numerals refer to the same parts throughout the various Figures.

DESCRIPTION OF THE PREFERRED EMBODIMENT

Figure 5:
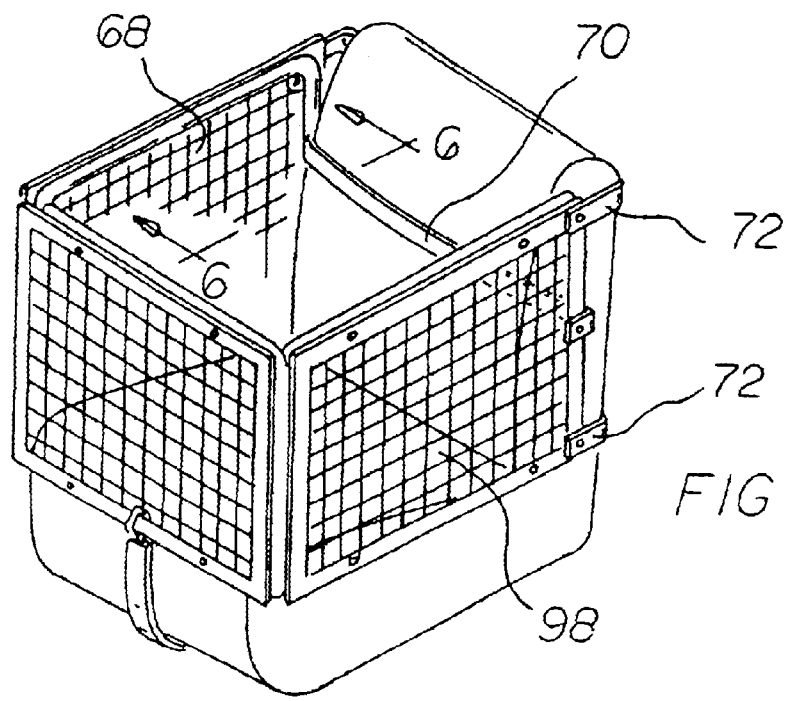
FIG. 5 is a perspective illustration of an alternate embodiment of the invention.

With reference now to the drawings, and in particular to FIG. 1 thereof, the preferred embodiment of the new and improved car seat netting system embodying the principles and concepts of the present invention and generally designated by the reference numeral 10 will be described.

The present invention, the car seat netting system 10 is comprised of a plurality of components. Such components in their broadest context include a car seat assembly, a tube assembly, and a securement assembly. Such components are individually configured and correlated with respect to each other so as to attain the desired objective.

First provided is a car seat assembly 12. The car set assembly has a seat portion 14 and a back portion 16. The seat portion is in an essentially horizontal plane with a top and a bottom and with a front edge and a parallel back edge and with two parallel side edges there between to form a first front corner 18 and a second front corner 20. The back portion is in a substantially vertical plane with a front and a back and with an upper edge and a parallel lower edge and with two parallel side edges there between with the lower edge adjacent to the rear edge of the seat portion to form a first rear corner 24 and a second rear corner 26.

Next provided is a screen assembly. The screen assembly includes a flexible front screen section 28 and flexible side screen sections 30. The front screen section is in a generally rectangular configuration with an upper edge and a parallel lower edge and two parallel side edges there between. The lower edge is positioned adjacent to the front of the seat portion and the side edges are spaced a distance essentially equal to the distance between the side edges of the seat portion. The side screen portions are in a generally rectangular configuration. The side screen portion has an interior edge 32 and a parallel exterior edge 34 and parallel upper and lower edges there between. The height of the side edges of the front screen section are essentially equal to the height of the side edges of front screen section. The exterior end of one side screen section has attached thereto a c-shaped handle 36.

A vertical tube assembly is next provided. The vertical tube assembly includes an enlarged tube 38 and a slender tube 40. The side edges of the front screen section are secured between the enlarged tube and the slender tube. A leg 42, 44 extends downwardly from each tube. Each leg is positionable between a downwardly extended orientation and a retracted orientation essentially within its associated vertical tube. The slender tube has a pair of hooks 46 for receiving the handle of the side screen.

Next, a handling assembly 48 is provided. The handling assembly includes a spindle 50 coaxially located within the enlarged tube. The spindle is secured to the interior end of a side screen section. The spindle has a spring 52 tending to rotate the spindle to wind the screen assembly there around. A slot 54 in the enlarged tube is provided for the sliding passage of the screen assembly between a coiled orientation and an uncoiled orientation. In this manner, when in the uncoiled orientation, the legs are extended adjacent to the front corners of the seat portion with the majority of the side screen assembly out of the enlarged tube and extended rearwardly and around the back portion and forwardly with the handle coupled to the hooks to thereby safely retain large objects on the seat portion. When in the coiled orientation the legs are retracted adjacent to the rear corners of the seat portion with the minority of the side screen out of the enlarged tube and extended rearwardly and around the back portion and forwardly with the handle coupled to the hooks to thereby safely retain small objects on the seat portion.

Next provided is a flexible strap 56. The flexible strap has a length slightly greater than the distance between the side edges of the back portion. The strap has ends with a clip 58 at each end adapted to couple to the side screen section above the side edges of the seat portion for securing small objects on the seat portion. Multiple securement straps may be used in one net for compartmentalizing the interior.

Lastly, a securement assembly is provided. The securement assembly includes a cross bar 60 having a central extent and side extents with a front surface and a rear surface. A pair of elastomeric bracket 62 on the rear face adjacent to the side extents are provided for contacting the legs when extended. A connector 64 couples the rear face adjacent to the central extent to the bottom of the seat portion.

While this and various embodiments disclose the netting assembly as preferably fabricated of a net with apertures, it should be appreciated that any sheet material, with or without apertures, could readily be utilized.

Figure 6:
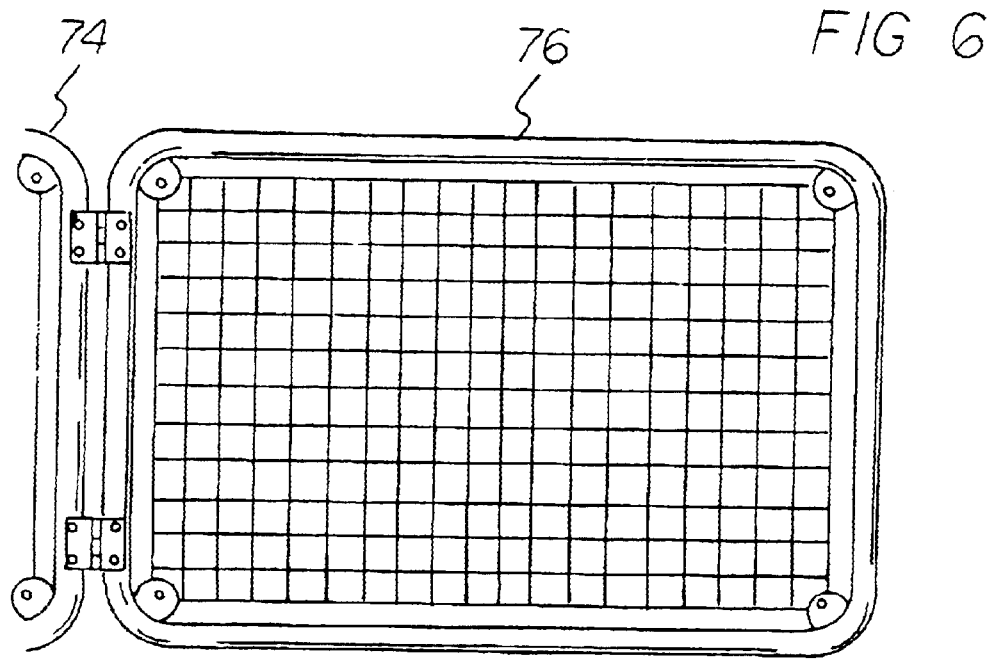
FIG. 6 is a left side elevational view taken along line 6—6 of FIG. 5.
Figure 7:
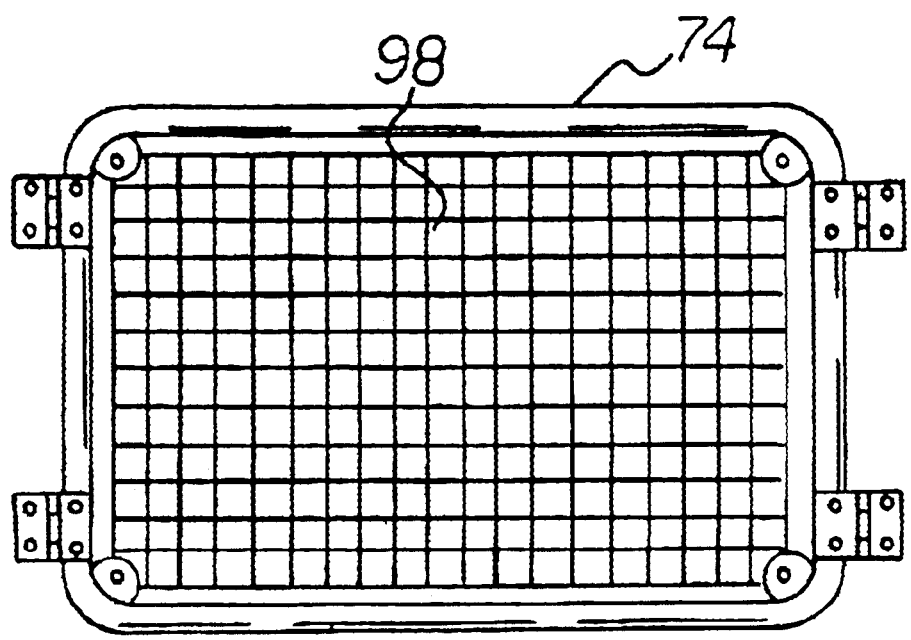
FIG. 7 is a front elevational view of the front screen shown in FIG. 5.

Shown in FIGS. 5 through 7 is an alternate embodiment of the invention. In such embodiment the side sheet portions include a plurality of straps 70, 72 there between. Such straps are adapted to be positioned adjacent to the front and the back of the back portion. Further included are a fixedly positioned frame 74, 76, each in a rectangular configuration and secured to the periphery of the front sheet portion and the side sheet portion. Hinges 78 couple the tubes of the front and side sheet portions.

Figure 8:
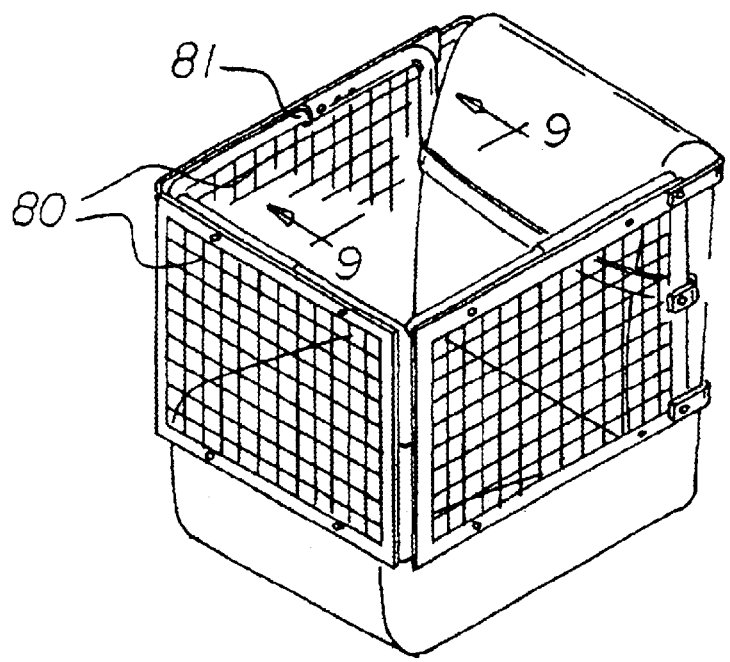
FIG. 8 is another alternate embodiment of the invention but illustrating an alternate coupling assembly.
Figure 9:
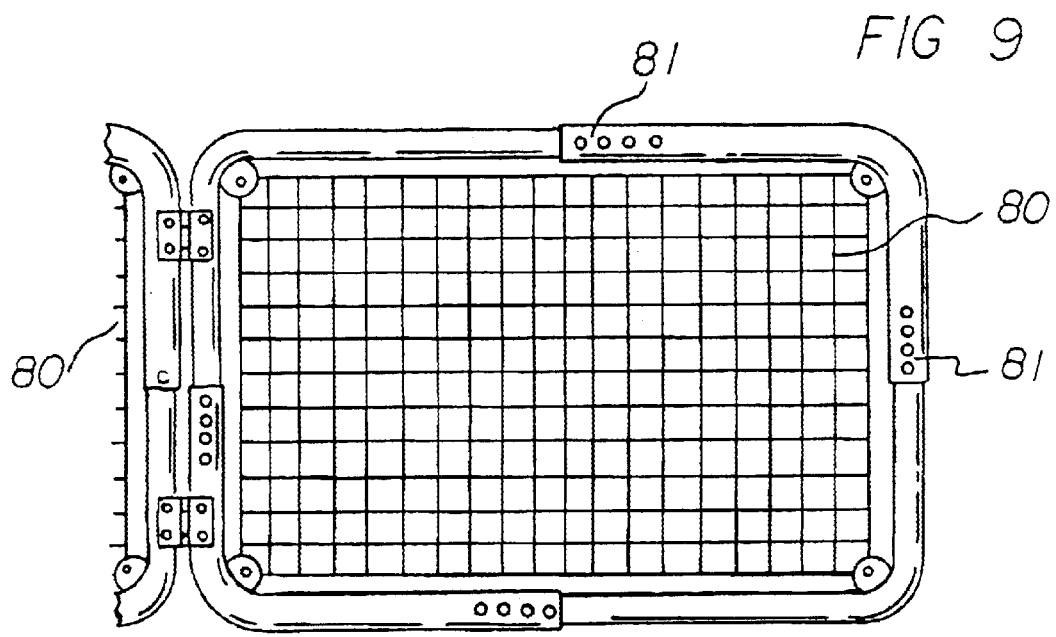
FIG. 9 is a front elevational view taken along line 9—9 of FIG. 8.

Shown in FIGS. 8 and 9 is another alternate embodiment of the invention. In such embodiment the side sheet portions include a plurality of straps there between adapted to be positioned adjacent to the front of the back portion and the back of the back portion. Further included are frames, each frame being in a rectangular configuration and secured to the periphery of the front sheet portion and the peripheries of the side sheet portions where the sheets 80 are elastic and further included are adjustment mechanisms 81 on the frames.

Figure 10:
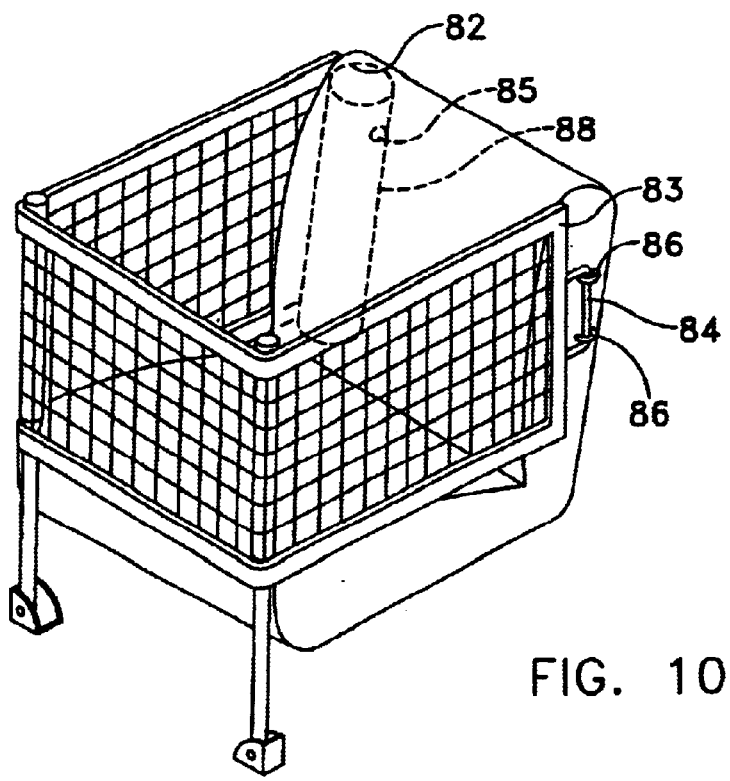
FIG. 10 is yet another alternate embodiment of the invention formed with pivotable legs constituting the securement assembly.
Figure 11:
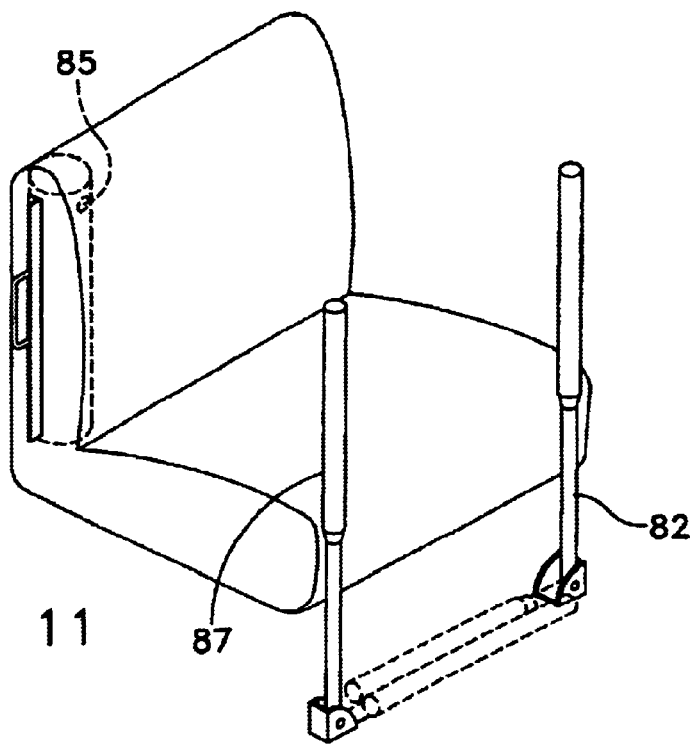
FIG. 11 is an alternate perspective illustration of the embodiment shown in FIG. 1 with the screens removed.
Figure 10A:
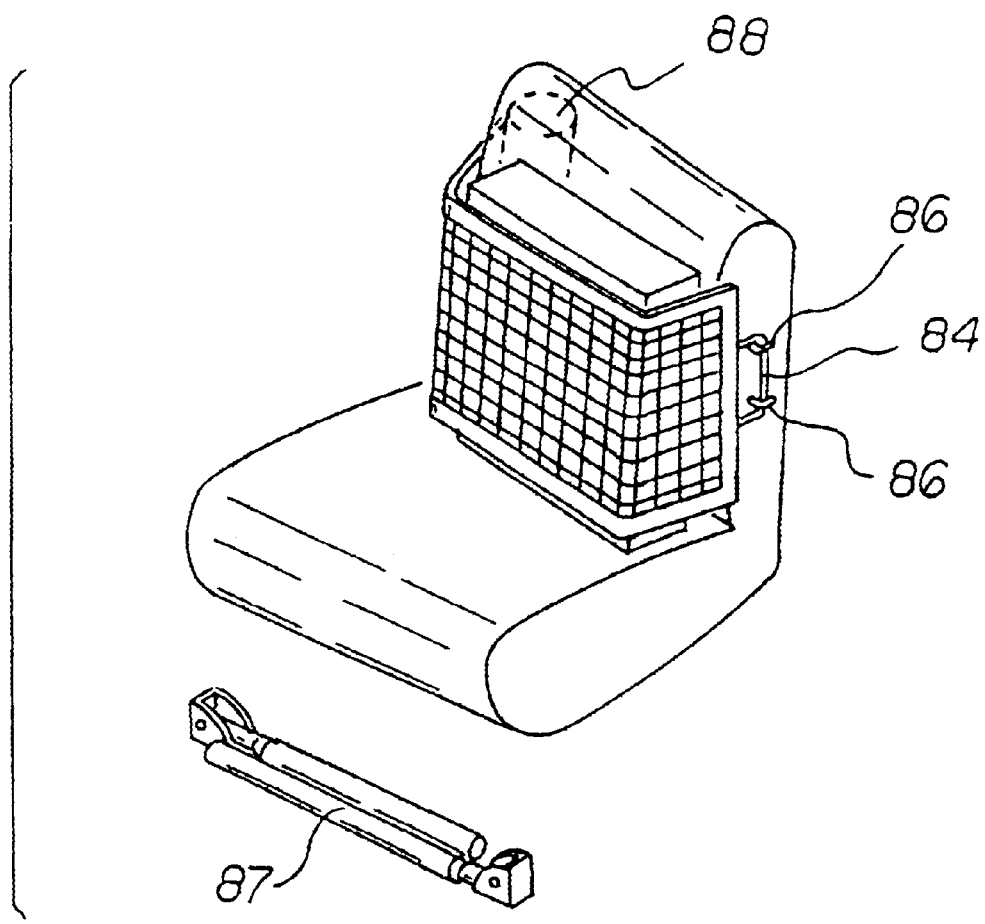
FIG. 10A is the alternate embodiment of FIG. 10 but configured in an alternate configuration.

Shown in FIGS. 10, 10A and 11 is another alternate embodiment of the invention. In such embodiment, the sheeting assembly includes an interior end 82 and an exterior end 83. The exterior end has attached thereto a handle B4. The sheeting assembly also has a front sheet portion in a central extent and soaced side sheet portions. Further included is an enlarged tube 85 attached to one side of the back portion adapted to removably contain the interior end of the sheeting assembly. Hooks 86 are on the other side of the back portion for removably receiving the handle. The system further includes retractable legs 87 secured beneath the front edge of the seat portion. The legs are adapted to constrain the position of the sheeting assembly with respect to the seat portion when the legs are extended. Note FIG. 10. When the legs are retracted, it allows the sheeting assembly to constrain objects against the back portion. Note FIG. 10A.

Shown in FIG. 12 is another alternate embodiment of the invention. In such embodiment the sheeting assembly 88 extends entirely around the area to be enclosed including the back portion of the seat. Further included are a pair of vertically extending legs 90 adjacent to the sides of the front edge of the seat portion.

Shown in FIG. 16 is another alternate embodiment of the invention. In such embodiment the side sheet portions have their ends coupled with straps 96 to the rear of the back portion. Further included is a securement assembly with a cross bar coupled to the seat portion.

Shown in FIG. 17 is another alternate embodiment of the invention. In such embodiment the side sheeting portions have their ends coupled with straps to the rear of the back portion. Further included a securement assembly with a cross bar. Further included an inverted J-shaped tube 98 coupled between the back of the seat portion and one edge of the side screen.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, if is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A car seat system comprising:

a car seat assembly having a horizontal seat portion with a front edge, at least one side edge, and a rear edge and a vertical back portion with a top edge and a bottom edge;

a sheeting assembly including a front sheet portion positionable above the front edge of the seat portion and a side sheet positioned above said at least one side edge of the seat portion;

a tube assembly including at least one vertical tube with the sheeting assembly coupled thereto, the tube being positionable adjacent to the seat portion; and a securement assembly coupling the sheeting assembly and tube in position with respect to the seat portion.

2. The system set forth in claim 1 wherein the sheeting assembly includes an interior end and an exterior end, the exterior end having attached thereto a handle, the sheeting assembly also having a front sheet portion in a central extent and spaced side sheet portions and further including an enlarged tub attached to one side of the back portion adapted to removably contain the interior end of the sheathing assembly and further including hooks on the other side of the back portion for removably receiving the handle, the system further including retractable legs secured beneath the front edge of the seat portion adapted to constrain the position of the sheeting assembly with respect to the seat portion when the legs are extended and, when the legs are retracted, to allow the sheet assembly to constrain objects against the back portion.

* * * * *

UNITED STATES PATENT AND TRADEMARK OFFICE
CERTIFICATE OF CORRECTION

PATENT NO. : 6,742,837 B1 Page 1 of 1
DATED : June 1, 2004
INVENTOR(S) : David P. Alexander It is certified that error appears in the above-identified patent and that said Letters Patent is hereby corrected as shown below:

<u>Column 8,</u>
Line 6, change "tub" to -- tube --;
Line 7, change "sheathing" to -- sheeting --.

Signed and Sealed this

Seventh Day of December, 2004

JON W. DUDAS
*Director of the United States Patent and Trademark Office*